Patented Mar. 23, 1943

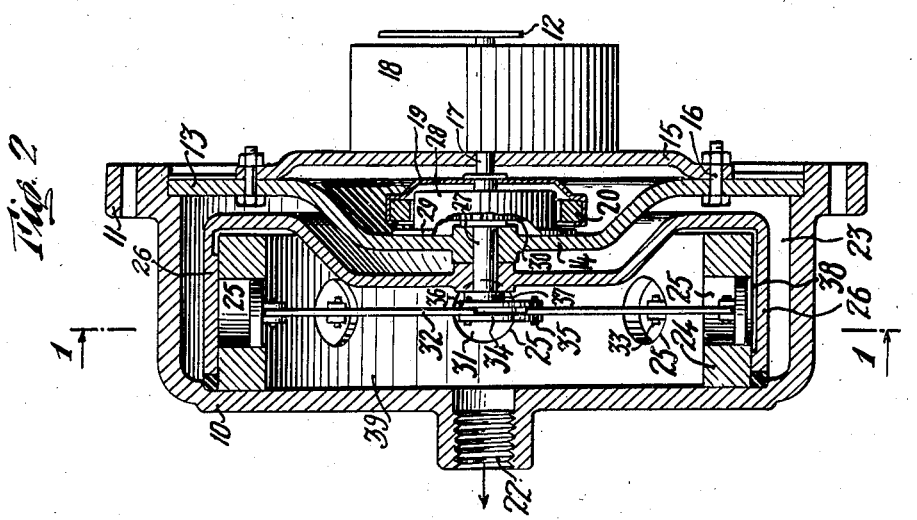
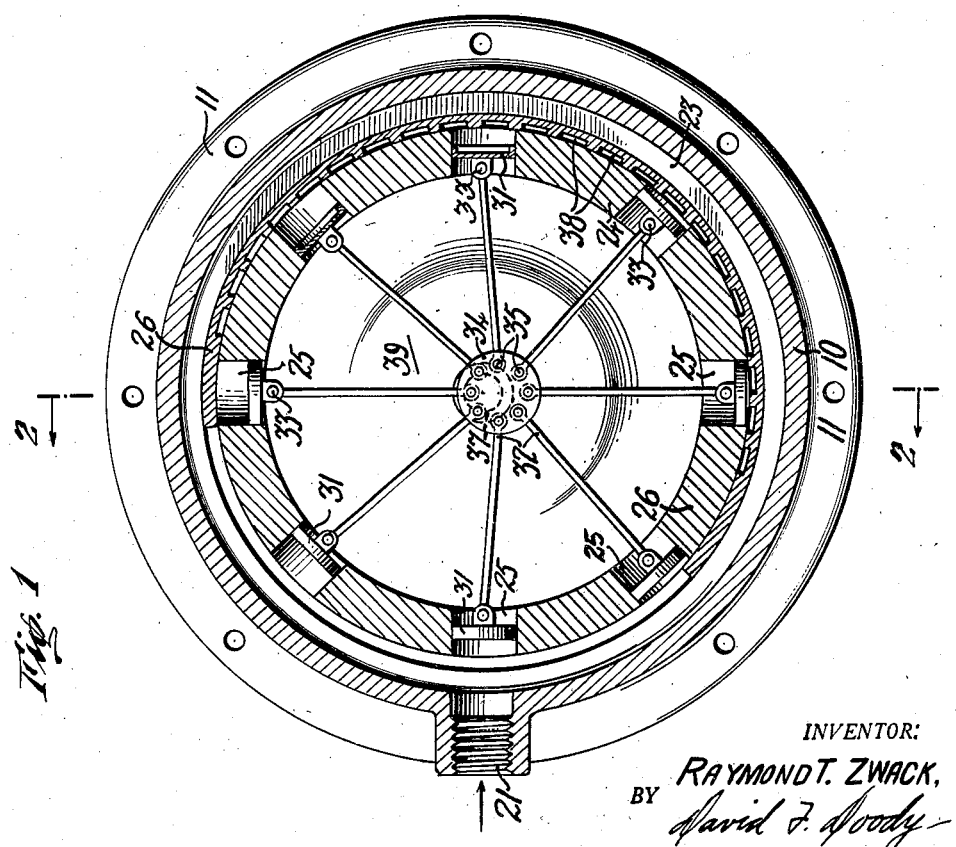

2,314,752

UNITED STATES PATENT OFFICE 2,314,752

FLOWMETER

Raymond T. Zwack, East Orange, N. J., assignor to Bendix Aviation Corporation, South Bend, Ind., a corporation of Delaware Application February 13, 1942, Serial No. 430,835

4 Claims. (Cl. 73—247)

This invention relates to flow meters, and more particularly to an instrument for totalizing the amount of flow of a liquid, such as fuel for an internal combustion engine.

It is an object of the present invention to provide a flow meter of the positive displacement type, having a totalizing counter, wherein the total flow of fluid is measured by the amount displaced in the meter.

A further object of the invention is the provision of a flow meter of the positive displacement type, wherein, by a unique valve arrangement, the flow of liquid through the meter proper is facilitated.

Other objects will become apparent from a study of the following specification when made in conjunction with the attached drawing, throughout which like numerals designate like parts.

Fig. 1 is a longitudinal view in section of one embodiment of the present invention, taken along the line 1—1 of Fig. 2; and Fig. 2 is a central cross-sectional view of the same embodiment, taken along the line 2—2 of Fig. 1.

Many flow meters, particularly for the measure of the instantaneous rate of flow of fuel to an internal combustion engine, have been devised, and certain attempts have been made in the past to provide a totalizing flow meter—that is, a flow meter that will indicate, at any instant, the absolute quantity of fluid that has been displaced from a reservoir or tank and has passed through the flow meter.

A good example of a rate-of-flow meter is that shown in the Zwack Patent No. 2,248,030. The present invention, however, is directed to a meter for totalizing the amount of flow, and its operation will be readily understood from the following description.

A generally cylindrical housing 10 has a conventional attaching flange 11, by which it is mounted in a desired station, for example, the cockpit of an aircraft, and has a front facing plate 13 attached by any desired means in a fluid-tight connection with housing 10. Plate 13 has a centrally depressed or dished portion 14, carrying a spider or attaching plate 15, by means of a plurality of bolts and nuts 16. The spider member 15 has a central aperture, through which a stub shaft 17 extends into a conventional type of totalizer 18, such as a Veeder counter. Shaft 17 carries a cup member 19, within the outer flange portion of which is secured an annular permanent magnet 20, which may be of the type shown at 41 in the above-identified Zwack patent. The counter member 18 carries a conventional pointer 12, which, in cooperation with a suitable dial on the front face of counter 18, is used to indicate the total amount of flow through the meter of the present invention.

Housing 10 has a fluid inlet 21 and a fluid outlet 22. The inlet 21 opens into an annular space 23 within housing 10, this space being defined by the cylindrical wall of housing 10, and by an annular cylinder block 24 having a plurality of radially disposed cylinders 25 therein, and a rotatable sleeve valve 26, which is centrally keyed to a shaft 27, which passes through an aperture in the center of plate 13, and projects into a cap member 28, having a flanged portion 29 welded or otherwise carried upon the dished portion 14 of plate 13 in a fluid-tight connection. Cylinder block 24 is attached to the abutting end-wall of housing 10 by any ordinary means such as bolts or a weld. Shaft 27 terminates in the cap portion 28 bearing a bar magnet 30 of any conventional type. Piston members 31 are contained within cylinders 25 and are connected to connecting rods 32 through pin members 33. The connecting rods 32 all extend radially toward a central connector plate 34, to which each of the connecting rods 32 is pivoted, by means of pin members 35. Plate 34 is connected to a face plate 36 of a crank pin 37, carried at the outer end of shaft 27.

It will be noted that sleeve valve 26 extends about cylinder block 24 for the major portion of its circumference, and that it completely covers the top, or radially outermost, end of five of the eight cylinders 25, and is imperforate thus preventing liquid flowing through inlet 21 into the annular space 23 from entering any of these covered cylinders. Of the five cylinders covered at their outer ends by sleeve valve 26, one, which, in the drawing, is shown to be the topmost cylinder 25, is sealed by the inner wall of valve 26, while the outermost ends of the other four cylinders 25 are open to communication with the central inner portion or crank-case 39 of housing 10, by means of a plurality of fluted passageways 38, formed on the interior wall of sleeve valve 26 and extending axially of valve 26.

The novel flow meter of the present invention is particularly well adapted to measure the flow of fuel and oil in aircraft, due to its light and compact design, and its operation is as follows:

Liquid entering through inlet 21 will immediately flow throughout the annular space 23, filling up all the available free space outside the crank-case 39 of the meter. It is understood, of course, that as the engines demand more fuel—that is, as the instantaneous rate of flow increases—then the pressure creating this flow increases, and for course, as the demand for fuel drops off, the pressure decreases correspondingly. When the fluid has filled the space 23, the pressure on the pistons 31 that are not covered by valve 26, will force these pistons 31 radially inwardly, causing the crank pin 37 to be rotated, thus driving shaft 27, and also carrying sleeve valve 26 therewith, and the permanent magnet 30 contained within the cap portion 28. The speed with which pistons 31 move inwardly will depend upon the pressure of the liquid, and thus, as the flow increases, shaft 27 is driven faster, and when the flow decreases, shaft 27 is driven at a slower rate, and in the total elapsed time during which the flow is being measured, the amount of fuel passing through meter 10 will be totalized on the conventional counter 18 and indicated by pointer 12.

The topmost piston 31 shown in the drawing, is at the bottom of its travel in cylinder 25. The other pistons covered by valve 26 are at different points of travel in an outward direction, and the liquid is displaced outwardly from these cylinders through the fluted portions 38 into the crank-case 39, whence it flows from the meter through the outlet 22, and into a conventional fuel line. The topmost piston 31 being at the bottom of its travel, then displacement of liquid outwardly is not accomplished until the crank pin 37 has rotated the plate 34 a few degrees, by which time, the topmost cylinder 25 is covered, not by the solid portion of valve 26, but by the fluted portions 38, and liquid may be readily displaced through the passageways 38, into crank-case 39 and through liquid outlet 22.

All the liquid entering through the inlet 21 must pass through the cylinders 25 and be displaced outwardly through the passageways 38 into crank-case 39 prior to ejection into the fuel line through the outlet 22. Thus, all the liquid entering inlet 21 is subject to measure by the positive displacement in the cylinders 25, and as the displacement is carried out, shaft 27 is being rotated at a speed depending upon the rate of displacement, and therefore, pointer 12 of counter 18 may be calibrated to read directly in pounds or gallons, as desired.

It is obvious, of course, that shafts 27 and 17 may be linked by means other than the magnetic couple shown, but when the magnetic couple is used, cap 28 confines all liquid within housing 10, and the necessity for an inherently high-friction stuffing box required for a through-shaft is eliminated.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

What is claimed is:

1. A flow meter comprising a closed, cylindrical housing having a fluid inlet and a fluid outlet, an annular body fixed coaxially within said housing, a plurality of equally spaced, radially disposed cylinders formed in said body, a piston in each of said cylinders, a crank-shaft coaxially of said housing and annular body, a connector plate carried by said crank-shaft, connecting rods pivotally connected between each of said pistons and said connector plate, a sleeve valve member overlying said annular body for a major part of the periphery thereof, said sleeve valve member having connection to said crank-shaft through a radially projecting, imperforate plate portion and having an axially fluted inner surface forming passageways for fluid displaced from said cylinders, said passageways being in communication with said fluid outlet, and totalizing means actuated upon rotation of said crank-shaft to indicate fluid flow.

2. A flow meter comprising a closed, cylindrical housing, a fluid inlet and a fluid outlet, said inlet and outlet being out of direct fluid communication, an annular body coaxially disposed within said housing, said inlet being radially outwardly of said body and said outlet being radially inwardly of said body, a plurality of equally spaced, radially extending cylinders formed in said body, a piston carried within each of said cylinders, a crank-shaft disposed coaxially of said annular body, connecting rods pivotally connected to said pistons and to said crank-shaft, a sleeve valve overlying said annular body for the major portion of its periphery, said valve being fastened to said crank-shaft through a radially extending, imperforate plate portion, means formed in said valve for affording communication between said cylinders and said outlet, there being an annular chamber radially outwardly of said sleeve valve and in direct communication with said inlet, certain of said cylinders being exposed to said chamber so that the pistons thereof may be displaced inwardly by pressure of fluid entering through said inlet, and totalizing means actuated by rotation of said crank-shaft to indicate fluid flow through said meter.

3. A flow meter comprising a closed, cylindrical housing having a fluid inlet and a fluid outlet, an annular body fixed coaxially within said housing, a plurality of radially disposed cylinders formed in said annular body, a piston in each of said cylinders, a crank-shaft coaxially of said housing and said annular body, connecting rods pivotally connected between each of said pistons and said crank-shaft, rotatable sleeve valve means of such angular extent as to overlie several of said cylinders, means for securing said valve to said crank-shaft to be rotatable therewith, fluid passageway means carried by said valve for affording communication between said cylinders and said outlet, there being an annular chamber defined by the cylindrical wall of said housing and annular body, said inlet being open to said chamber and said cylinders being open thereto in sequence upon rotation of said valve, and totalizing means driven by said crank-shaft for measuring the amount of fluid flow through said housing.

4. A flow meter comprising a closed, cylindrical housing, a fluid inlet and a fluid outlet, said inlet and outlet being out of direct fluid communication, an annular body coaxially disposed within said housing, said inlet being radially outwardly of said body and said outlet being radially inwardly of said body, a plurality of radially extending cylinders formed in said body, a piston reciprocable within each of said cylinders, a crank-shaft disposed coaxially of said annular body, connecting rods pivotally connected to said pistons and to said crank-shaft, an arcuate valve overlying said annular body of sufficient extent to cover several of said cylinders, said valve being secured to said crank-shaft, means disposed on said valve for affording fluid communication between said cylinders and said outlet, there being an annular chamber within said housing radially outwardly of said valve and in direct communication with said inlet, certain of said cylinders being sequentially open to said chamber by said valve, so that fluid may flow into said open cylinders and depress said pistons, thus rotating said crank-shaft and said valve, and means driven by said crank-shaft for indicating fluid flow.

RAYMOND T. ZWACK.